United States Patent
Lu et al.

(10) Patent No.: US 12,423,677 B2
(45) Date of Patent: *Sep. 23, 2025

(54) USING ON-CHAIN DATA FOR GENERATING A TOKEN DATA FEED

(71) Applicant: Coinbase, Inc., Oakland, CA (US)

(72) Inventors: Chaoqing Lu, Oakland, CA (US);
Catalin Tiseanu, Oakland, CA (US);
Wisam Dakka, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/934,967

(22) Filed: Sep. 23, 2022

(65) Prior Publication Data
US 2024/0104551 A1  Mar. 28, 2024

(51) Int. Cl.
| | |
|---|---|
| *G06Q 30/06* | (2023.01) |
| *G06F 16/2455* | (2019.01) |
| *G06F 16/9535* | (2019.01) |
| *G06F 21/31* | (2013.01) |
| *G06Q 20/06* | (2012.01) |
| *G06Q 20/36* | (2012.01) |
| *G06Q 30/0601* | (2023.01) |

(52) U.S. Cl.
CPC ....... *G06Q 20/367* (2013.01); *G06F 16/2455* (2019.01); *G06F 16/9535* (2019.01); *G06F 21/31* (2013.01); *G06Q 20/065* (2013.01); *G06Q 30/0631* (2013.01); *G06Q 2220/00* (2013.01); *G06Q 2220/165* (2013.01)

(58) Field of Classification Search
CPC .............. G06Q 20/367; G06Q 20/065; G06Q 30/0631; G06Q 2220/00; G06Q 2220/165; G06F 16/2455; G06F 16/9535; G06F 21/31; G06N 3/08; G06N 7/01; G06N 20/00; H04L 9/3213; H04L 9/3297; H04L 9/50

See application file for complete search history.

(56) References Cited

U.S. PATENT DOCUMENTS

| | | | |
|---|---|---|---|
| 11,818,409 B1 * | 11/2023 | Weikel | G06Q 30/0202 |
| 2023/0071093 A1 * | 3/2023 | Madhusudhan ... | G06Q 30/0601 |
| 2023/0367615 A1 * | 11/2023 | Hara | G06Q 40/04 |
| 2024/0104173 A1 * | 3/2024 | Tiseanu | G06F 21/31 |

FOREIGN PATENT DOCUMENTS

| | | | | |
|---|---|---|---|---|
| WO | WO-2020092900 A2 * | 5/2020 | | G06F 21/602 |

* cited by examiner

*Primary Examiner* — Linglan Edwards
*Assistant Examiner* — Saron Matthewos Worku
(74) *Attorney, Agent, or Firm* — Foley & Lardner LLP

(57) ABSTRACT

Methods and systems are described herein for performing a cold start operation of a system for acquiring non-fungible tokens (NFTs) using on-chain data. In particular, a user feed initialization system may receive an on-chain address associated with a cryptography-based storage application (e.g., an address associated with a crypto wallet of a user) and determine, based on the on-chain address, NFTs that the user's cryptography-based storage application controls (e.g., NFTs that the user owns). The user feed initialization system may use on-chain data associated with the NFTs (e.g., via interrogating the on-chain programs associated with the NFTs that the user owns) to identify (e.g., via a machine learning model) other NFTs that the user may desire to acquire.

20 Claims, 10 Drawing Sheets

| On-Chain Program Identifier | Source Identifier | Destination Identifier | Token Identifier |
|---|---|---|---|
| 0xBC4CA0EdA7647A8aB7C2061c2E118A18a936f13D | 0xB3d21Aaebc09a61Ad6E268B8B243AA40Fb0aAAA | 0x92fAB452E2F14C7730f79031906E06326c91BBB | 2476 |
| 0xBC4CA0EdA7647A8aB7C2061c2E118A18a936f13A | 0xaf06e7ca8e77bd17dee07d7c7fcbd33d6689231a | 0x5f6ac80cdb9e87f3cfa6a90e5140b9a16a361d5c | 1871 |

FIG. 2

| On-Chain Program Identifier | Creator | Attribute 1 | Attribute 2 |
|---|---|---|---|
| 0xBC4CA0EdA7647A8aB7C2061c2E118A18a936f13D | 0xaBA7161A7fb69c88e16ED9f455CE62B791EE4D03 | <attribute data> | <attribute data> |
| 0xBC4CA0EdA7647A8aB7C2061c2E118A18a936f13A | 0xaBA7161A7fb69c88e16ED9f455CE62B791EE4D04 | <attribute data> | <attribute data> |

| Field | Value |
|---|---|
| Address | 0xBC4CA0EdA7647A8aB7C2061c2E118A18a936f13D |
| User ID | User-1 |
| Privacy Login | True |

603 — Field/Value row
606 — Address row
609 — Privacy Login row

USING ON-CHAIN DATA FOR GENERATING A TOKEN DATA FEED

BACKGROUND

In recent years, the use of blockchains and blockchain technology has exponentially increased. Blockchains are built upon lists of records, called "blocks," that are "chained" together using cryptography. Each block may include data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. Many current blockchains allow creation of new cryptographic tokens that may be exchanged for other cryptographic tokens or otherwise sent and received between users. A subset of these tokens is sometimes referred to as non-fungible tokens (NFTs). NFTs, unlike fungible tokens that are all the same (e.g., Bitcoins), are created to be differentiated from each other. For example, when a user acquires a Bitcoin, the user cannot tell whether one Bitcoin is different from another Bitcoin as those tokens are all the same (i.e., fungible). However, when a user acquires an NFT, that token is unique and, thus, two NFTs can be differentiated (e.g., based on their attributes).

Various systems exist today that enable acquisition of NFTs. Many of those system have graphical user interfaces that enable users to browse/preview those NFTs before acquiring them. When a user accesses such a system for the first time, it may be difficult to display, for the user, NFTs that the user may be interested in acquiring as the system would have no knowledge of NFTs preferred by the user. In particular, when a user first logs into the system, the system has no knowledge or data of any user interactions with other NFTs or NFT collections. In addition, when a user subsequently logs into the system, the user may not want those user interactions recorded by the system (e.g., by setting a flag within a profile) or the user may login with an application (e.g., a web browser) with a privacy setting enabled, thus, again, not allowing the system any knowledge of the user's preferences. As a result, the system may be unable to display any NFTs that the user may prefer.

SUMMARY

Therefore, methods and systems are described herein for performing a cold start operation or a privacy-preserving login of such a system using on-chain data. Generally, on-chain data is public such that any user is able to access the blockchain node and retrieve all on-chain data. Accordingly, when users commit data to a blockchain there is no expectation of privacy. At best, users may expect pseudonymity where their actions may not be tracked to them personally, but may be tracked to the cryptography-based storage application. In particular, a user feed initialization system may receive an on-chain address associated with a cryptography-based storage application (e.g., an address associated with a crypto wallet of a user) and determine, based on the on-chain address, NFTs that the user's cryptography-based storage application controls (e.g., NFTs that the user owns). The user feed initialization system may use on-chain data associated with the NFTs (e.g., via interrogating the on-chain programs associated with the NFTs that the user owns) to identify (e.g., via a machine learning model) other NFTs that the user may desire to acquire.

In some embodiments, the user feed initialization system may perform the following operation when a user logs in into the system for the first time or when there is no information available for displaying NFTs for the user. The user feed initialization system may receive an on-chain address associated with a cryptography-based storage application. For example, the user may login to an application (e.g., an Internet-based application) using a cryptography-based storage application that has a corresponding address (e.g., an address associated with a user's crypto wallet). The login may be a first login by the user into the application. In some embodiments, the application may determine that the user has never logged into the application before.

The user feed initialization system may retrieve blockchain operation data associated with the on-chain address. The blockchain operation data may include one or more program identifiers for one or more on-chain programs. For example, the user feed initialization system may query a blockchain node and identify all cryptographic tokens (e.g., NFTs) that are controlled by the cryptography-based application of the user. Furthermore, the user feed initialization system may identify on-chain programs (e.g., smart contracts) that created (e.g., minted) those cryptographic tokens. Those on-chain programs may have associated metadata such as creator identifier, and other suitable metadata.

The user feed initialization system may interrogate those on-chain programs for that metadata. Thus, the user feed initialization system may generate, based on the one or more program identifiers, one or more data requests for the one or more on-chain programs to obtain one or more sets of non-fungible token attributes. Each data request of the one or more data requests may include a query to a corresponding on-chain program for non-fungible token data. In some embodiments, each set of the one or more sets of non-fungible token attributes may be associated with a corresponding non-fungible token. For example, the user feed initialization system may generate a dataset entry for each non-fungible token such that each entry may include attributes of the corresponding on-chain program.

In some embodiments, to interrogate the on-chain programs, the user feed initialization system may generate data requests for the on-chain programs. The data requests may be generated using program identifiers associated with those on-chain programs and may be used to obtain non-fungible token datasets associated with the on-chain user address. Each of the data requests may include a query to a corresponding on-chain program for non-fungible token data and a program identifier for the corresponding on-chain program. Furthermore, each of the non-fungible token datasets may include a set of non-fungible token attributes associated with a corresponding non-fungible token.

In some embodiments, when the requests are generated, the user feed initialization system may transmit the data requests to a blockchain node of a blockchain hosting one or more of the plurality of on-chain programs. The blockchain node may extract non-fungible attributes from corresponding on-chain programs and transmit those attributes to the user feed utilization system. The user feed initialization system may receive, from the blockchain node, a corresponding set of non-fungible token attributes for each on-chain program of the plurality of on-chain programs and generate a dataset that includes each corresponding set of non-fungible token attributes.

The user feed initialization system may determine, via a machine learning model, one or more non-fungible tokens for a user based on the one or more sets of non-fungible token attributes. For example, the user feed initialization system may input, into a machine learning model the sets of non-fungible token attributes. The machine learning model may identify one or more patterns of token attributes associated with the user and compare those patterns with attribute sets associated with available non-fungible tokens. The user feed initialization system may then provide one or more indications of the one or more non-fungible tokens to a user device of the user. For example, the user feed initialization system may identify, based on the matching patterns, other non-fungible tokens that a user may desire. The user feed initialization system may then generate for display to the user (e.g., on a user device) representations (e.g., images) of those non-fungible tokens. In some embodiments, the user feed initialization system may generate for display the corresponding attribute patterns associated with those tokens.

When the user originally logs in, the user feed initialization system may setup a user profile for the user. The user's profile may store various parameters associated with the user. In some embodiments, the user's profile may store indications of user preferences for NFTs. For example, the system may track user interactions with various NFTs within the system and then determine preferences of the user for various types of NFTs. However, many users do not want to be tracked (i.e., users do not want their Internet activity recorded). As a result, users may not use the system knowing that they are being tracked. Accordingly, the system may allow users anonymous login or may allow a user to set a privacy flag on the user's account so that the user is able to opt out of tracking. As a result, the system may not have access to user preferences as though the user has logged in for the first time.

Thus, a user feed initialization system may detect, at an application, a login request from a client device. The login request may include an on-chain address of a cryptography-based storage application. The application may be a web application that is able to read the on-chain address of the cryptography-based storage application (e.g., a crypto wallet) connected to a web browser of the user. In some embodiments, the application may be a decentralized application ("dapp") enabled to perform various cryptographic functions and/or blockchain functions. The application may read the address of the user's cryptography-based storage application.

When the user feed initialization system identifies an address of the cryptography-based storage application, the user feed initialization system is able to identify on-chain tokens associated with that address. Thus, the user feed initialization system may retrieve on-chain operation data associated with the on-chain address. The on-chain operation data may include one or more program identifiers for one or more on-chain programs. For example, those on-chain programs may be smart contracts which were used to mint cryptographic tokens associated with the address (e.g., NFTs owned by the user).

The user feed initialization system may determine, based on one or more login parameters associated with the on-chain address, whether to initiate a privacy-preserving login for a user. For example, the user feed initialization system may access the user's profile and determine that a flag within the profile indicates that the user indicated a privacy-preserving login. The flag may also indicate that no privacy-preserving login is required. In some embodiments, the user feed initialization system may identify a browser version or browser mode that forces a privacy-preserving login. The user feed initialization system may also determine that the privacy-preserving login is not required.

Based on determining to not initiate the privacy-preserving login for the user, the user feed initialization system may proceed to retrieve off-chain data associated with one or more interactions between the user and the application. For example, the user feed initialization system may retrieve the interactions from a profile of the user or from another suitable location. The user feed initialization system may determine, via a machine learning model, one or more non-fungible tokens for a user based on the on-chain operation data and the off-chain data. In some embodiments, the user feed initialization system may use only on-chain or only off-chain data for the token determination. However, in some embodiments, the user feed initialization system may use both on-chain and off-chain data.

Based on determining to initiate the privacy-preserving login for the user, the user feed initialization system may use on-chain data (e.g., may not use any interaction data). Thus, the user feed initialization system may determine, via a machine learning model, one or more non-fungible tokens for a user based on the on-chain operation data without using the off-chain data. For example, the machine learning model may generate a category or a pattern that represents a preference of the user for an NFT. The user feed initialization system may use that category or pattern to locate other NFTs that the user may prefer.

In some embodiments, the user feed initialization system may perform this operation without using machine learning. For example, the user feed initialization system may use rules to identify patterns within the on-chain data. The user feed initialization system may then provide one or more indications of the one or more non-fungible tokens for the user to a user device of the user. In some embodiments, the user feed initialization system may perform image analysis on NFTs associated with the user's cryptography-based storage application and use the image analysis results to locate other NFTs with similar image analysis results.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a data structure storing blockchain operation data, in accordance with one or more embodiments of this disclosure.

FIG. 3 illustrates an excerpt of a data structure storing metadata associated with on-chain programs, in accordance with one or more embodiments of this disclosure.

FIG. 6 illustrates an example of a login request, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
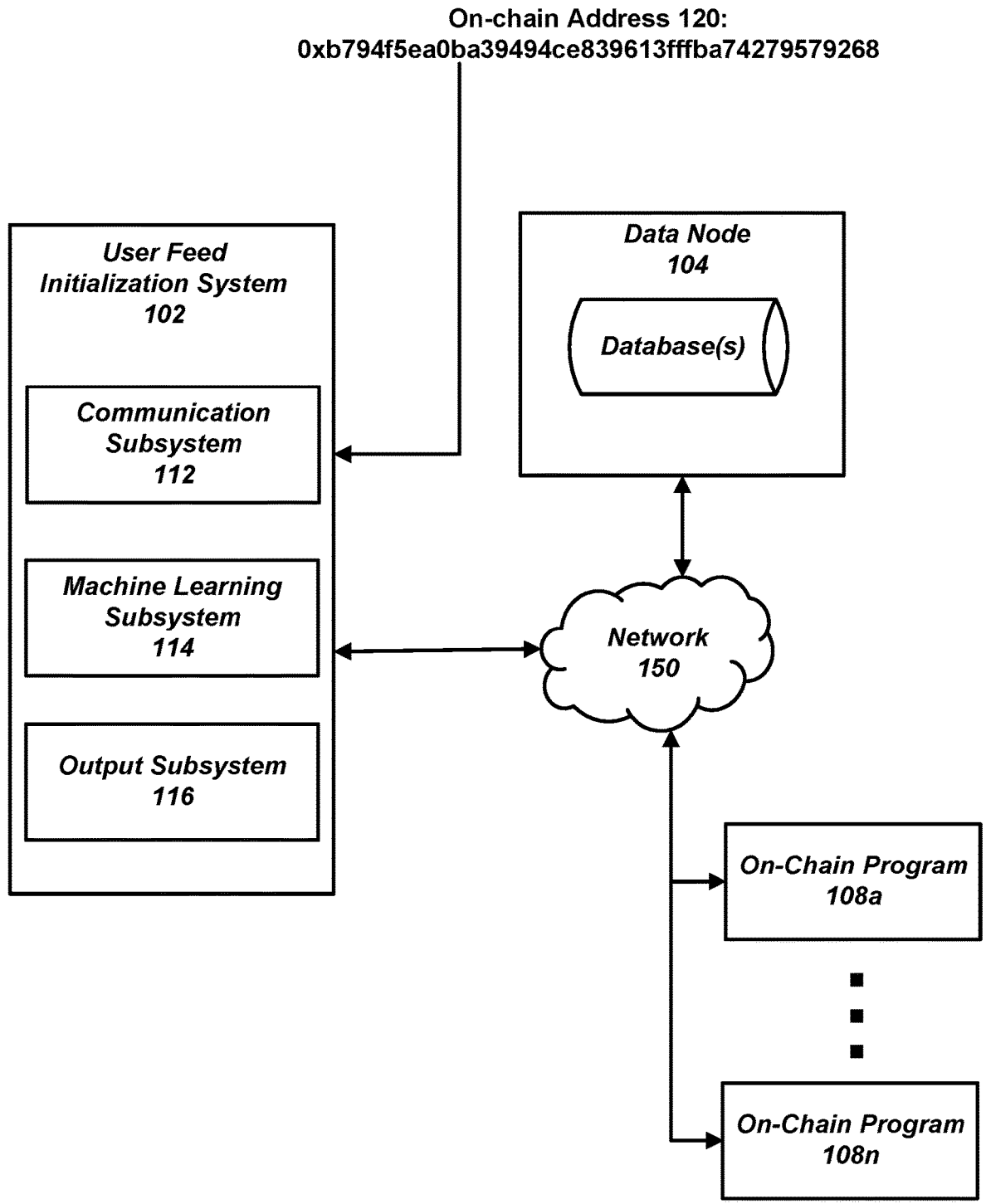
FIG. 1 shows an illustrative system for performing user feed initialization using on-chain data, in accordance with one or more embodiments of this disclosure.

FIG. 1 is an example of environment 100 for performing user feed initialization using on-chain data. Environment 100 includes user feed initialization system 102, data node 104, and on-chain programs 108a-108n. User feed initialization system 102 may execute instructions for performing a cold start operation using on-chain data. User feed initialization system 102 may include software, hardware, or a combination of the two. For example, user feed initialization system 102 may reside on a physical server or a virtual server that is running on a physical computer system. In some embodiments, user feed initialization system 102 may be configured on a user device (e.g., a laptop computer, a smart phone, a desktop computer, an electronic tablet, or another suitable user device).

Data node 104 may store various data, including one or more machine learning models, training data, non-fungible token data (e.g., extracted from blockchain operation data), and/or other suitable data. In some embodiments, data node 104 may also be used to train the machine learning model. Data node 104 may include software, hardware, or a combination of the two. For example, data node 104 may be a physical server, or a virtual server that is running on a physical computer system. In some embodiments, user feed initialization system 102 and data node 104 may reside on the same hardware and/or the same virtual server/computing device. Network 150 may be a local area network, a wide area network (e.g., the Internet), or a combination of the two. On-chain programs 108a-108n may be programs (e.g., smart contracts) residing on a blockchain. For example, a smart contract may be a program written in Solidity and deployed on the blockchain. An on-chain program may be executed by a blockchain node.

Cold Start Operation

User feed initialization system 102 may perform a cold start operation (e.g., when a user has not previously logged-in to the system). A cold start operation may involve the following operations. User feed initialization system 102 may receive an on-chain address 120 associated with a cryptography-based storage application. An example of the on-chain wallet address is: 0xb794f5ea0ba-39494ce839613fffba74279579268. User feed initialization system 102 may receive the on-chain address using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the on-chain address from data node 104 or from another computing device. Communication subsystem 112 may pass the on-chain program address, or a pointer to the sound data in memory, to machine learning subsystem 114. Machine learning subsystem 114 may include software components, hardware components, or a combination of both. For example, machine learning subsystem 114 may include software components that may access or use one or more machine learning models. Machine learning subsystem 114 may access the on-chain address, for example, in memory.

In some embodiments, communication subsystem 112 may receive the on-chain address for a device associated with a user (a user device) and that is hosting a cryptography-based storage application. For example, a user device may be a computing device (e.g., a desktop, laptop, electronic tablet), a smartphone or another suitable device. The user, via the user device, may access an application (e.g., a web application) that may enable a user to acquire non-fungible tokens. The application may include the user feed initialization system. Thus, when a user logs in into the application (e.g., using an address associated with the user's cryptography-based storage application), the application may obtain the address associated with the cryptography-based storage application and determine, based on the address, whether the user has previously logged in into the application. That is, user feed initialization system 102 may receive the on-chain address associated with the cryptography-based storage application in response to detecting an initial login associated with a user indicating that the user has not logged in before.

In some embodiments, in response to detecting an initial login associated with a user, user feed initiation system 102 may extract the on-chain user address associated with a cryptography-based storage application of the user and use that address for blockchain data retrieval. In particular, machine learning subsystem 114 may retrieve blockchain operation data associated with the on-chain address. The blockchain operation data may include one or more program identifiers for one or more on-chain programs. For example, machine learning subsystem 114 may retrieve blockchain operation datasets associated with the on-chain user address and extract program identifiers for a plurality of on-chain programs from the blockchain operation datasets. To perform the retrieval operation, machine learning subsystem 114 may query a blockchain (e.g., via a blockchain node), for blockchain data that includes the address associated with the cryptography-based storage application of the user. The user feed initialization system may then filter the data to identify non-fungible tokens that are controlled by the cryptography-based application associated with the user (e.g., identify non-fungible tokens owned by the user).

In some embodiments, machine learning subsystem 114 may perform the following operations for extracting the program identifiers for the plurality of on-chain programs from the blockchain operation datasets. These operations may also be performed as part of an operation to retrieve blockchain operation data. Machine learning subsystem 114 may identify a plurality of cryptographic tokens associated with the on-chain user address. For example, machine learning subsystem 114 may query the blockchain (e.g., via a blockchain node) for all transactions involving an address associated with the cryptography-based storage application. Machine learning subsystem 114 may then determine a subset of the plurality of cryptographic tokens that includes non-fungible tokens. For example, machine learning subsystem 114 may perform this operation based on type of token (e.g., based on a standard for generating non-fungible tokens).

Machine learning subsystem 114 may then determine, based on each non-fungible token in the subset, one or more on-chain programs associated with the subset. For example, machine learning subsystem 114 may identify a data field within each non-fungible token corresponding to an identifier of an associated on-chain program (e.g., an address of a smart contract that minted the non-fungible token and/or is able to transfer the non-fungible token to another user). Machine learning subsystem 114 may then extract a corresponding program identifier for each on-chain program and store those program identifiers in memory.

Many blockchains in existence today include a number of blocks starting with a creation block and building other blocks on top of that block. Each block stores blockchain operation data (e.g., transfers token control from one cryptography-based storage application to another). FIG. 2 illustrates an excerpt of a data structure 200 storing blockchain operation data. Data structure 200 may include field 203 that stores an on-chain program identifier corresponding to an on-chain program involved in the operation. For example, field 203 may store an identifier of a smart contract that is enabled to transfer control of a non-fungible token from one cryptography-based storage application to another cryptography-based storage application. Field 206 may include a source identifier of a cryptography based-storage application. For example, field 206 may include an address (e.g., a source address) associated with a cryptography-based storage application that was used to sign a blockchain operation to transfer control of a non-fungible token to another cryptography-based storage application. Field 209 may include a destination identifier which may correspond to an address (e.g., a target address) associated with a cryptography-based storage application that, after the blockchain operation, will control the non-fungible token. Field 212 may store a token identifier (e.g., a non-fungible token identifier) representing a token that will be transferred (e.g., from the source address to a target address).

When the blockchain operation data is retrieved, the system (e.g., user feed initialization system 102) may extract from that data, on-chain program identifiers (e.g., smart contract addresses) for on-chain programs that minted and are enabled to transfer non-fungible tokens controlled by the user's cryptography-based storage application. Machine learning subsystem 114 may then interrogate those on-chain programs (e.g., smart contracts) for their attributes. In particular, machine learning subsystem 114 may generate, based on the one or more program identifiers, one or more data requests for the one or more on-chain programs to obtain one or more sets of non-fungible token attributes. Each data request may include a query to a corresponding on-chain program for non-fungible token data. Furthermore, each set of non-fungible token attributes may be associated with a corresponding non-fungible token. Thus, machine learning subsystem 114 may identify each on-chain program (from the blockchain operation data) such that a user's cryptography-based storage application controls at least one non-fungible token that the on-chain program has created (e.g., minted) and is able to transfer that non-fungible token to be controlled by another cryptography-based storage application. Machine learning subsystem 114 may then generate a request for each on-chain program for attributes associated with that on-chain program. For example, each on-chain program may be associated with metadata about the on-chain program and machine learning subsystem 114 may retrieve that information.

In some embodiments, the data requests may include multiple pieces of information. Each data request may include a query to a corresponding on-chain program for non-fungible token data. For example, machine learning subsystem 114 may generate a query based on an application programming interface supported by a blockchain node. Each request may also include a program identifier for the corresponding on-chain program. When the data requests are generated, machine learning subsystem 114 may use those requests to obtain attributes of the on-chain program (e.g., non-fungible token attributes). Machine learning subsystem 114 may transmit (e.g., via communication subsystem 112) the data requests to a blockchain node of a blockchain hosting the on-chain programs. The blockchain node may receive each request and process the request to retrieve the required data from the blockchain.

Machine learning subsystem 114 may receive, from the blockchain node, a corresponding set of non-fungible token attributes for each on-chain program of the plurality of on-chain programs and generate a dataset comprising each corresponding set of non-fungible token attributes. For example, the dataset may include an entry for each non-fungible token owned by the user (e.g., controlled by a cryptography-based storage application associated with the user). Each entry may include a plurality of fields that include attributes associated with each on-chain program and/or other attributes associated with each non-fungible token.

FIG. 3 illustrates an excerpt of a data structure 300 storing information related to multiple on-chain programs. Field 303 may store an on-chain program identifier for each on-chain program. Field 306 may store an identifier of the creator of the on-chain program. In some embodiments, this field may store a cryptography-based application address (e.g., a wallet address) associated with the creator of the on-chain program. Field 309 and field 312 may store one or more other attributes associated with a corresponding on-chain program.

In some embodiments, user feed initialization system 102 may preload the data into a database (e.g., a database on data node 104). User feed initialization system 102 may query the blockchain and retrieve identifiers of all non-fungible tokens and cryptography-based storage application addresses that control those non-fungible tokens. User feed initialization system 102 may also query, for each non-fungible token, the on-chain program (e.g., the smart contact) that minted and is able to transfer the non-fungible token for attributes and store those attributes with each non-fungible token.

Machine learning subsystem 114 may input each set of non-fungible token attributes into a machine learning model to determine available non-fungible tokens for the user. For example, the sets of non-fungible token attributes may be stored as a part of an input file, where each attribute may be a feature and each entry within the file may correspond to a non-fungible token owned by the user (e.g., controlled by a cryptography-based storage application associated with the user). That is, machine learning subsystem 114 may determine, via a machine learning model, one or more non-fungible tokens for a user based on the one or more sets of non-fungible token attributes.

Machine learning subsystem 114 or another suitable subsystem may train the machine learning models to identify non-fungible tokens that may be of interest to the user. The machine learning model may be trained to identify patterns of non-fungible token attributes that the user may be interested in based on non-fungible tokens that the user owns. Thus, machine learning subsystem 114 may receive a training dataset that includes a plurality of attribute sets corresponding to a plurality of non-fungible tokens. Each attribute set may include a plurality of attributes and a label classifying each corresponding non-fungible token. For example, the labels may be based on collections for non-fungible tokens (e.g., Bored Ape Yacht Club) or based on quality of non-fungible tokens (e.g., blue chips). Other labels may be used based on attributes of the on-chain programs. Machine learning subsystem 114 may input the training dataset into a training routine of the machine learning model and the training routine may train the machine learning model using the training dataset.

Figure 4:
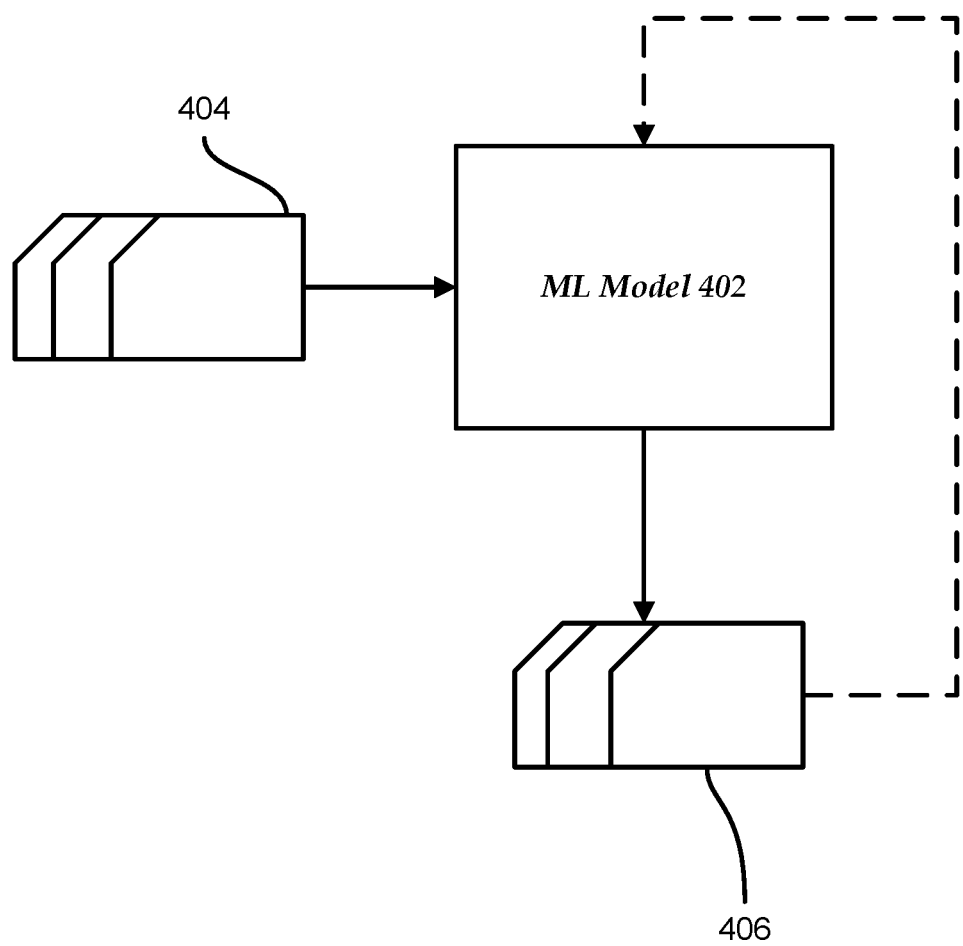
FIG. 4 illustrates an exemplary machine learning model, in accordance with one or more embodiments of this disclosure.

FIG. 4 illustrates an exemplary machine learning model. The machine learning model may have been trained using a mechanism described above to identify non-fungible token attribute patterns based on attributes of non-fungible tokens owned by a user. Machine learning model 402 may take input 404 (e.g., non-fungible token attributes) and may output one or more patterns 406 representing non-fungible attribute patterns that the user prefers. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output. In a neural network, connection weights may be adjusted, for example, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Machine learning subsystem 114 may receive the output of the machine learning model (e.g., patterns of non-fungible token attributes) and pass those attributes to output subsystem 116. Output subsystem 116 may include software components, hardware components, or a combination of both. For example, output subsystem 116 may include software components that may access or use one or more databases (e.g., on data node 104) to identify available non-fungible tokens. Output subsystem 116 may provide one or more indications of the one or more non-fungible tokens to a user device of the user. Output subsystem 116 may access available non-fungible tokens and retrieve non-fungible token attributes for those non-fungible tokens. Output subsystem 116 may then compare the patterns output by the machine learning model with attributes for those non-fungible tokens retrieved from the database.

Figure 5:
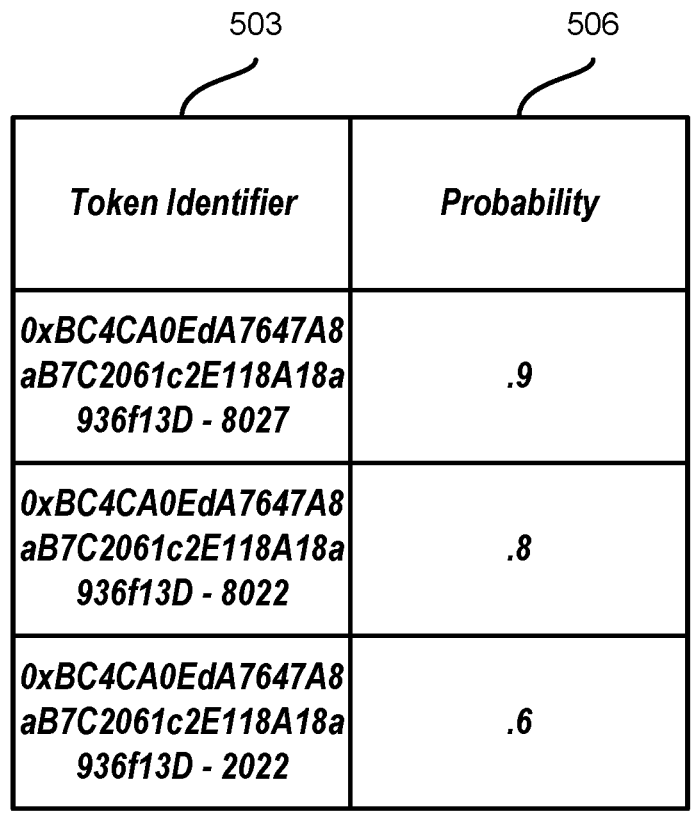
FIG. 5 illustrates an example of a match of a pattern to attributes, in accordance with one or more embodiments of this disclosure.

FIG. 5 is a data structure 500 that illustrates an example of a match of a non-fungible token attribute set with a pattern output by the machine learning model. Field 503 includes a token identifier for an available token. The token identifier may be stored in a database (e.g., on data node 104). The token identifier may be associated with a non-fungible token generated on a blockchain and available for acquisition. Field 506 stores a probability that the non-fungible token associated with the token identifier matches the pattern. In some embodiments, the probability may refer to how well the token matches the pattern. Thus, output subsystem 116 may select non-fungible tokens to present to the user based on the probability and/or matching probability.

In some embodiments, machine learning subsystem 114 may receive from the machine learning model (e.g., instead of a pattern) a category associated with the non-fungible tokens preferred by the user and use those categories to identify available non-fungible tokens to recommend to the user. In particular, machine learning subsystem 114 may receive, from the machine learning model, one or more categories of non-fungible tokens for the user. For example, the machine learning subsystem may receive "blue chips" as a category. Machine learning subsystem 114 may pass the category to output subsystem 116. Output subsystem 116 may compare the one or more categories of non-fungible tokens with a plurality of non-fungible token categories within a database (e.g., on data node 104). Each category of the one or more categories of non-fungible tokens may correspond to one or more available non-fungible tokens. Output subsystem 116 may identify the one or more non-fungible tokens that match the one or more categories of non-fungible tokens. For example, each non-fungible token within the database may have a corresponding category which may be read by output subsystem 116 for comparison.

In some embodiments, a category may correspond to an on-chain program. For example, an on-chain program may have been built to transfer non-fungible tokens associated with "Bored Ape Yacht Club." Thus, that on-chain program may correspond to "Bored Ape Yacht Club." Thus, output subsystem 116 may determine an associated on-chain program for a first category of the one or more categories of non-fungible tokens and receive, from the associated on-chain program, a listing of available non-fungible tokens. For example, output subsystem 116 may query the database for any available non-fungible tokens that correspond to "Bored Ape Yacht Club."

In some embodiments, user feed initialization system 102 may, additionally or alternatively, use other mechanisms for recommending NFTs to a user. For example, user feed initialization system 102 may use image analysis for the recommendations. In particular, user feed initialization system 102 may determine, for a first non-fungible token associated with the on-chain address, that the first non-fungible token represents an image. For example, the non-fungible token may be a digital piece of art owned by the user. User feed initialization system 102 may make the determination by, for example, retrieving the metadata associated with an NFT by using a uniform resource identifier ("URI") within the NFT.

User feed initialization system 102 may then generate, using an image analysis algorithm, a pattern associated with the image. For example, user feed initialization system 102 may vectorize the image or perform another operation on the image to generate the pattern. In some embodiments, user feed initialization system 102 may add the pattern to a corresponding non-fungible token dataset. Thus, the pattern may be used as part of the machine learning recommendation process described above. However, in some embodiments, the pattern may be used outside of the machine learning process. For example, user feed initialization system 102 may retrieve other NFTs and perform the same process to generate a pattern from the image. User feed initialization system 102 may then compare the patterns and recommend NFTs with similar patterns.

In some embodiments, the machine learning model (e.g., machine learning model described above) may assign a category to the user based on the NFTs owned by the user and use that category to recommend other NFTs. In particular, user feed initialization system 102 may receive, from the machine learning model, one or more categories of non-fungible tokens for the user. The machine learning model may identify categories based on attributes of NFTs that the user owns. For example, a category may be based on different collections (e.g., Bored Ape Yacht Club). In another example, a category may be based on the type of NFTs the user owns (e.g., "blue chip" NFTs). The machine learning model may be trained to identify other types of categories based on on-chain program attributes and/or combinations of on-chain program attributes and image analysis results.

User feed initialization system 102 may compare the one or more categories of the non-fungible tokens with a plurality of non-fungible token categories within a database. For example, the machine learning model may categorize all available NFTs and store the category information in a database (e.g., on data node 104). Thus, each category of the one or more categories of the non-fungible tokens may correspond to one or more available non-fungible tokens. User feed initialization system 102 may then identify the one or more non-fungible tokens that match the one or more categories of the non-fungible tokens. For example, output subsystem 116 may search a database (e.g., database on data node 104) for NFTs with a matching category. When the NFTs to recommend to a user are located, user feed initialization system 102 may provide one or more indications of the one or more non-fungible tokens for the user to a user device of the user.

Privacy-Preserving Operation

User feed initialization system 102 may perform a privacy-preserving operation (e.g., when a user has set a privacy flag on the user's profile or when the user is connecting with an application that does not allow for tracking user interactions). Privacy-preserving operation may involve the following operations.

User feed initialization system 102 may detect a login request from a client device. The login request may include an on-chain address of a cryptography-based storage application. For example, a user may use a web browser to connect to an Internet-based application. The application may be enabled to detect an address of a cryptography-based storage application that is added to the web browser (e.g., via a web browser extension). In some embodiments, the application may be a decentralized application that enables transferring cryptographic tokens (e.g., NFTs) between cryptography-based storage applications. For example, the decentralized application may include functionality to call an application programming interface (API) associated with a smart contract that enables transfer of NFTs that were minted (e.g., generated) by that smart contract. User feed initialization system 102 may perform the detection using communication subsystem 112.

User feed initialization system 102 may retrieve on-chain operation data associated with the on-chain address. However, because of the privacy requirement, feed initialization system 102 may not retrieve any off-chain data (e.g., the feed initialization data may not retrieve user interactions with the system). The on-chain operation data may include one or more program identifiers for one or more on-chain programs. For example, blockchain operation data is illustrated in FIG. 2 and discussed in relation to that figure, above. Furthermore, user feed initialization system 102 may retrieve the blockchain operation data from a blockchain node. For example, user feed initialization system 102 may generate an API call to the blockchain node for retrieving the blockchain operation data. In some embodiments, the blockchain operation data may be retrieved at an earlier time and stored in a database (e.g., a database on data node 104). Thus, user feed initialization system 102 may retrieve the on-chain operation data from a database. User feed initialization system 102 may perform the retrieval operation using communication subsystem 112.

In some embodiments, user feed initialization system 102 may filter the on-chain operation data to identify NFTs from all cryptographic tokens indicated within the on-chain operation data. In particular, user feed initialization system 102 may identify a plurality of cryptographic tokens associated with the on-chain address. For example, user feed initialization system 102 may parse the on-chain data to determine cryptographic token addresses associated with the address of the cryptography-based storage application of the user (e.g., all cryptographic tokens owned/controlled by the crypto wallet of the user).

User feed initialization system 102 may then determine a subset of the plurality of cryptographic tokens that are non-fungible tokens. For example, user feed initialization system 102 may identify the on-chain programs that are associated with the particular cryptographic tokens and based on the on-chain program identifiers, determine whether a token is an NFT or another type of cryptographic token. In another example, user feed initialization system 102 may use a token type to determine whether a token is an NFT or a fungible token. The user feed initialization may use Ethereum request for comment (ERC) specifications for the determination. An NFT may be an ERC-721 token while a fungible token may be an ERC-20 token.

User feed initialization system 102 may then determine, based on the non-fungible tokens in the subset, the one or more on-chain programs associated with the subset. For example, each NFT may store an identifier of an on-chain program (e.g., smart contract) associated with that NFT. For example, user feed initialization system 102 may determine those on-chain program identifiers from the NFT token data. User feed initialization system 102 may then extract program identifiers for a plurality of on-chain programs from the subset. In some embodiments, user feed initialization system 102 may store the on-chain data in memory.

User feed initialization system 102 may further determine, based on one or more login parameters associated with the on-chain address, whether to initiate a privacy-preserving login for a user. For example, user feed initialization system 102 may extract the one or more login parameters from the login request. Those parameters may include web browser version, user identifier, and/or other parameters in addition to the address of the cryptography-based storage application associated with the user. FIG. 6 illustrates an example of a data structure 600 of a login request. Field 603 may store an address of a cryptography-based storage application associated with the requesting device. Field 606 may include a user identifier. In some embodiments, the user identifier may not be provided. For example, if a privacy-preserving login is being initiated, the field 606 may be blank or may not exist. Field 609 may include a privacy login flag. In some embodiments, the privacy login flag may be blank or may not exist as the flag may be stored with the user profile on a computing device that is executing user feed initialization system 102. Thus, in some embodiments, the login request may only include field 603 and the address may correspond to a profile of the user and a user identifier that identifies the user to user feed initialization system 102.

In some embodiments, user feed initialization system 102 may extract the on-chain address associated with the cryptography-based storage application from the login request, as described above. User feed initialization system 102 may then retrieve a profile associated with the on-chain address. For example, the profile may be stored under the address of the cryptography-based storage application. That is, the profile identifier may be the address. In some embodiments, the profile may be stored under a particular user identifier (e.g., a user identifier that the user used to register with the system). User feed initialization system 102 may determine whether the profile associated with the on-chain address includes a privacy flag. For example, the profile may store a flag as a Boolean value, a string value, or another suitable value to indicate a privacy-preserving login. In response to determining that the profile associated with the on-chain address includes the privacy flag, user feed initialization system 102 may initiate the privacy-preserving login. In response to determining that the profile associated with the on-chain address does not include the privacy flag or includes a privacy-flag that indicates no privacy-preserving login, user feed initialization system 102 may initiate a no privacy-preserving login.

In some embodiments, the user may be prompted for whether to set a privacy flag (e.g., during an initial login to the system). User feed initialization system 102 may determine, based on the on-chain address, that the cryptography-based storage application was not used in a prior login request. For example, every time a user logs in, user feed initialization system 102 may determine whether a user (e.g., using a particular cryptography-based storage application or particular user identifier) has previously logged in into the system. To perform the determination, user feed initialization system 102 may search for a profile associated with the address. If the profile is not found, user feed initialization system 102 may determine that the user has not previously logged in. Thus, every time a user logs in, user feed initialization system 102 may create a profile for the user (e.g., using the address of the cryptography-based storage application as the user identifier).

In some embodiments, if user feed initialization system 102 determines that the user has not previously logged in, user feed initialization system 102 may generate a profile for the user and prompt the user whether to set the privacy flag. That is, in response to determining that the cryptography-based storage application was not used in the prior login request, user feed initialization system 102 may generate for display, (e.g., via a decentralized application being provided through a web browser), a prompt for setting a privacy flag for a profile associated with the on-chain address. Thus, the privacy flag may indicate not to record user activity. User feed initialization system 102 may then save the user's profile (e.g., in a database on data node 104) with the flag set.

Based on determining to not initiate the privacy-preserving login for the user, user feed initialization system 102 may use user interaction data to recommend NFTs to the user. User feed initialization system 102 may retrieve off-chain data associated with one or more interactions between the user and the application. For example, user feed initialization system 102 may retrieve the interaction data from a database (e.g., database on data node 104). In some embodiments, the user profile may store a list of preferences for the user. Those references may be determined using a machine learning model (e.g., a machine learning model described in relation to FIG. 4). However, in some embodiments, user feed initialization system 102 may pass the interaction data to machine learning subsystem 114. Machine learning subsystem 114 may pass the data to a machine learning model that may determine one or more non-fungible tokens for a user based on the on-chain operation data and the off-chain data. The output of the machine learning model may be one or more NFT attributes/characteristics that indicate the user's preferences for an NFT. Those preferences may be stored in the user's profile.

User feed initialization system 102 may read the privacy flag or may otherwise determine that a privacy-preserving login should be initiated. Based on determining to initiate the privacy-preserving login for the user, user feed initialization system may determine, via a machine learning model, one or more non-fungible tokens for a user based on the on-chain operation data without using the off-chain data. Off-chain data may refer to user interactions with other NFTs provided by the application. That is, for the privacy-preserving login, there may not be any off-chain data available to user feed initialization system 102. In some embodiments, user feed initialization system 102 may use a machine learning model described in relation to FIG. 4 to make the determination of NFTs for the user.

In some embodiments, to perform the determination, user feed initialization system 102 may interact with a blockchain node of a blockchain. Thus, based on determining to initiate a privacy-preserving login for the user, user feed initialization system 102 may generate, using the program identifiers (e.g., program identifiers extracted from NFTs controlled by the user's cryptography-based storage application), data requests for one or more on-chain programs to obtain, from the one or more on-chain programs, non-fungible token datasets associated with the on-chain address. Thus, each non-fungible token dataset may include a set of non-fungible token attributes associated with a corresponding non-fungible token. For example, as discussed above, machine learning subsystem 114 may extract the on-chain program identifiers from the NFTs owned by the user (e.g., controlled by the user's cryptography-based storage application).

Machine learning subsystem 114 may then generate one or more requests for on-chain program attributes (e.g., attributes of a smart contract including any metadata in relation to a smart contract) to be executed by a blockchain node of the blockchain. Each data request may include various data within the request. A data request may include a query to a corresponding on-chain program for non-fungible token data. For example, the on-chain program (e.g., a smart contract) may support one or more API calls to interrogate the on-chain program. Thus, machine learning subsystem 114 may use that API call as the query. In addition, each request may include a program identifier for the corresponding on-chain program. In some embodiments, the program identifier may identify the on-chain program to the blockchain node so that the blockchain node is enabled to execute the correct on-chain program.

When the one or more requests are generated, user feed initialization system 102 may transmit (e.g., using communication subsystem 112) the requests to a blockchain node or to multiple blockchain nodes. Thus, communication subsystem 112 may transmit the one or more data requests to a blockchain node of a blockchain hosting the one or more on-chain programs. Communication subsystem 112 may receive, from the blockchain node, a corresponding set of non-fungible token attributes for each on-chain program of the one or more on-chain programs. For example, as discussed above, the received attributes may include a creator address of the on-chain program and other attributes (e.g., including metadata). FIG. 3 and the related description illustrates an excerpt of a data structure storing the attributes. Machine learning subsystem 114 may then generate a dataset that includes each corresponding set of non-fungible token attributes. For example, the dataset may be stored in memory and/or on data node 104.

In some embodiments, user feed initialization system 102 may, additionally or alternatively, use other mechanisms for recommending NFTs to a user. For example, user feed initialization system 102 may use image analysis for the recommendations. In particular, user feed initialization system 102 may determine, for a first non-fungible token associated with the on-chain address, that the first non-fungible token represents an image. For example, the non-fungible token may be a digital piece of art owned by the user. User feed initialization system 102 may make the determination by, for example, retrieving the metadata associated with an NFT by using a uniform resource identifier ("URI") within the NFT.

User feed initialization system 102 may then generate, using an image analysis algorithm, a pattern associated with the image. For example, user feed initialization system 102 may vectorize the image or perform another operation on the image to generate the pattern. In some embodiments, user feed initialization system 102 may add the pattern to a corresponding non-fungible token dataset. Thus, the pattern may be used as part of the machine learning recommendation process described above. However, in some embodiments, the pattern may be used outside of the machine learning process. For example, user feed initialization system 102 may retrieve other NFTs and perform the same process to generate a pattern from the image. User feed initialization system 102 may then compare the patterns and recommend NFTs with similar patterns.

In some embodiments, the machine learning model (e.g., machine learning model described above) may assign a category to the user based on the NFTs owned by the user and use that category to recommend other NFTs. In particular, user feed initialization system 102 may receive, from the machine learning model, one or more categories of non-fungible tokens for the user. The machine learning model may identify categories based on attributes of NFTs that the user owns. For example, a category may be based on different collections (e.g., Bored Ape Yacht Club). In another example, a category may be based on the type of NFTs the user owns (e.g., "blue chip" NFTs). The machine learning model may be trained to identify other types of categories based on on-chain program attributes and/or combinations of on-chain program attributes and image analysis results.

User feed initialization system 102 may compare the one or more categories of the non-fungible tokens with a plurality of non-fungible token categories within a database. For example, the machine learning model may categorize all available NFTs and store the category information in a database (e.g., on data node 104). Thus, each category of the one or more categories of the non-fungible tokens may correspond to one or more available non-fungible tokens. User feed initialization system 102 may then identify the one or more non-fungible tokens that match the one or more categories of the non-fungible tokens. For example, output subsystem 116 may search a database (e.g., database on data node 104) for NFTs with a matching category. When the NFTs to recommend to a user are located, user feed initialization system 102 may provide one or more indications of the one or more non-fungible tokens for the user to a user device of the user.

Computing Environment

Figure 7:
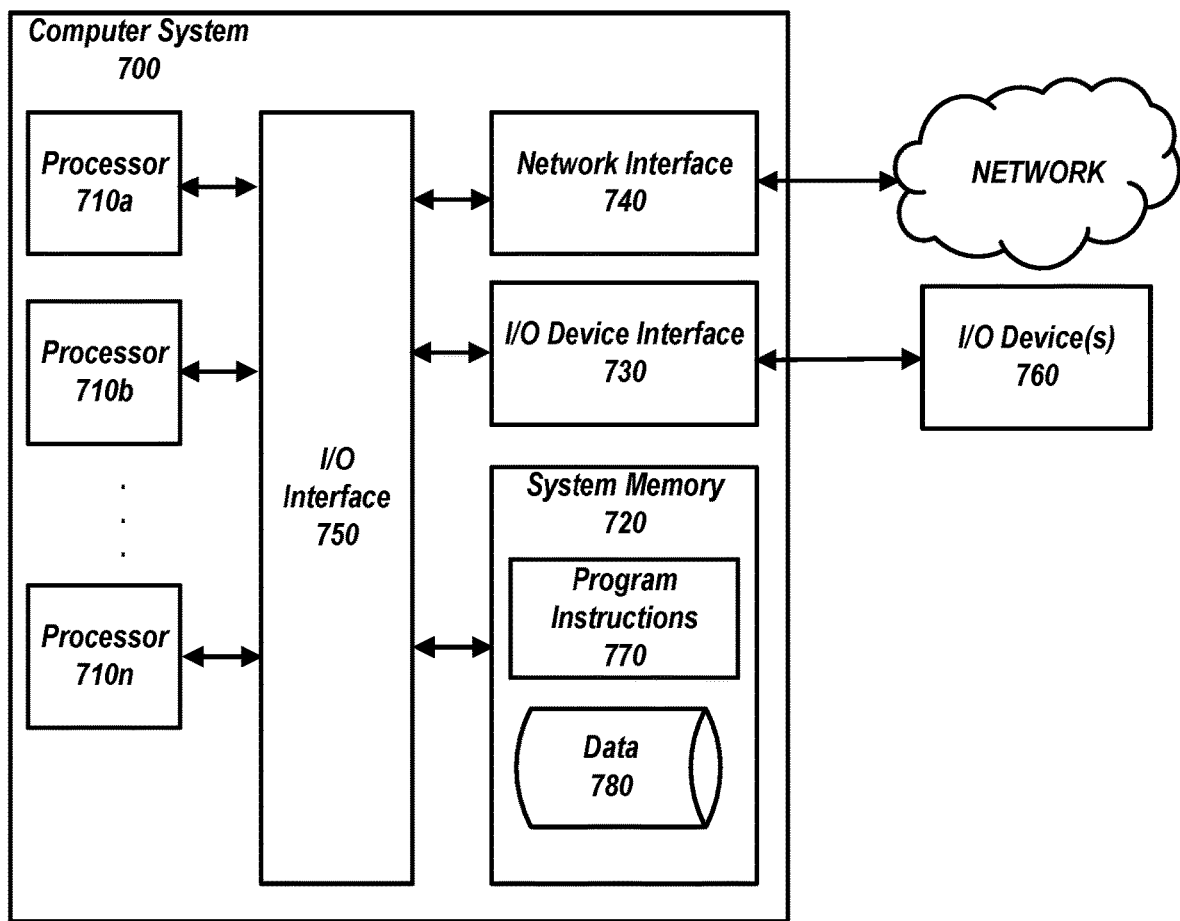
FIG. 7 illustrates a computing device, in accordance with one or more embodiments of this disclosure.

FIG. 7 shows an example computing system that may be used in accordance with some embodiments of this disclosure. In some instances, computing system 700 is referred to as a computer system 700. A person skilled in the art would understand that those terms may be used interchangeably. The components of FIG. 7 may be used to perform some or all operations discussed in relation to FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710*a*-710*n*) coupled to system memory 720, an input/output (I/O) device interface 730, and a network interface 740 via an I/O interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710*a*), or a multi-processor system including any number of suitable processors (e.g., 710*a*-710*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710*a*-710*n*) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. A non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory computer readable storage medium that may have program instructions stored thereon that are executable by a computer processor (e.g., one or more of processors 710*a*-710*n*) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710*a*-710*n*, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710*a*-710*n*). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 8:
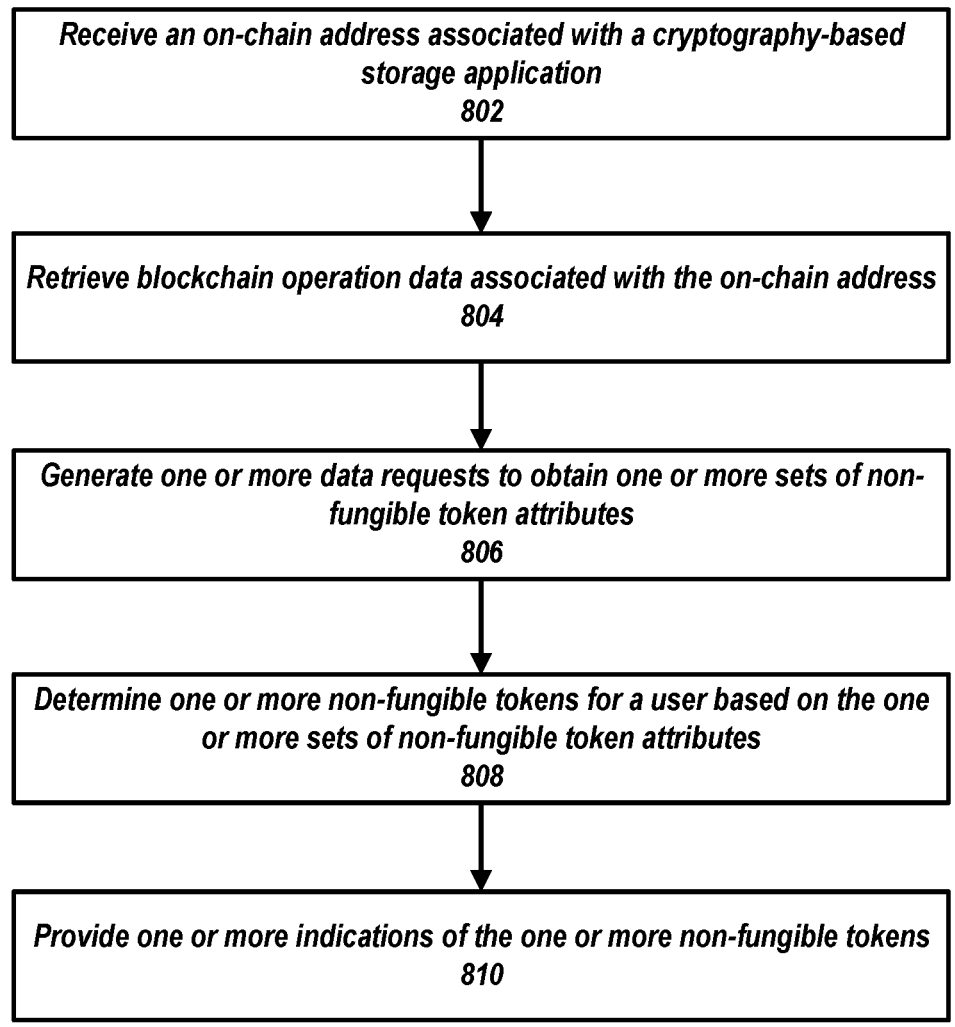
FIG. 8 is a flowchart of operations for performing a cold start operation, in accordance with one or more embodiments of this disclosure.

FIG. 8 is a flowchart 800 of operations for performing a cold start operation using on-chain data. The operations of FIG. 8 may use components described in relation to FIG. 7. In some embodiments, user feed initialization system 102 may include one or more components of computer system 700. At 802, user feed initialization system 102 receives an on-chain address associated with a cryptography-based storage application. For example, the user feed initialization system 102 may receive the on-chain address from data node 104 or from another suitable source. User feed initialization system 102 may receive the on-chain address over network 150 using network interface 740.

At 804, user feed initialization system 102 retrieves blockchain operation data associated with the on-chain address. User feed initialization system 102 may use one or more processors 710$a$, 710$b$, and/or 710$n$ to perform the retrieval. User feed initialization system 102 may retrieve the data from memory and/or from data node 104. The retrieval operation may be performed using a blockchain node via a network 150. At 806, user feed initialization system 102 generates one or more data requests to obtain one or more sets of non-fungible token attributes. For example, user feed initialization system 102 may use one or more processors 710$a$-710$n$ to perform the operation and store the results in system memory 720.

At 808, user feed initialization system 102 determines one or more non-fungible tokens for a user based on the one or more sets of non-fungible token attributes. For example, user feed initialization system 102 may use one or more processors 710$a$-710$n$ to perform the operation. At 810, user feed initialization system 102 provide one or more indications of the one or more non-fungible tokens. For example, user feed initialization system 102 may use one or more processors 710$a$-710$n$ to perform the operation and transmit the results to a client device using network interface 740 via network 150.

Figure 9:
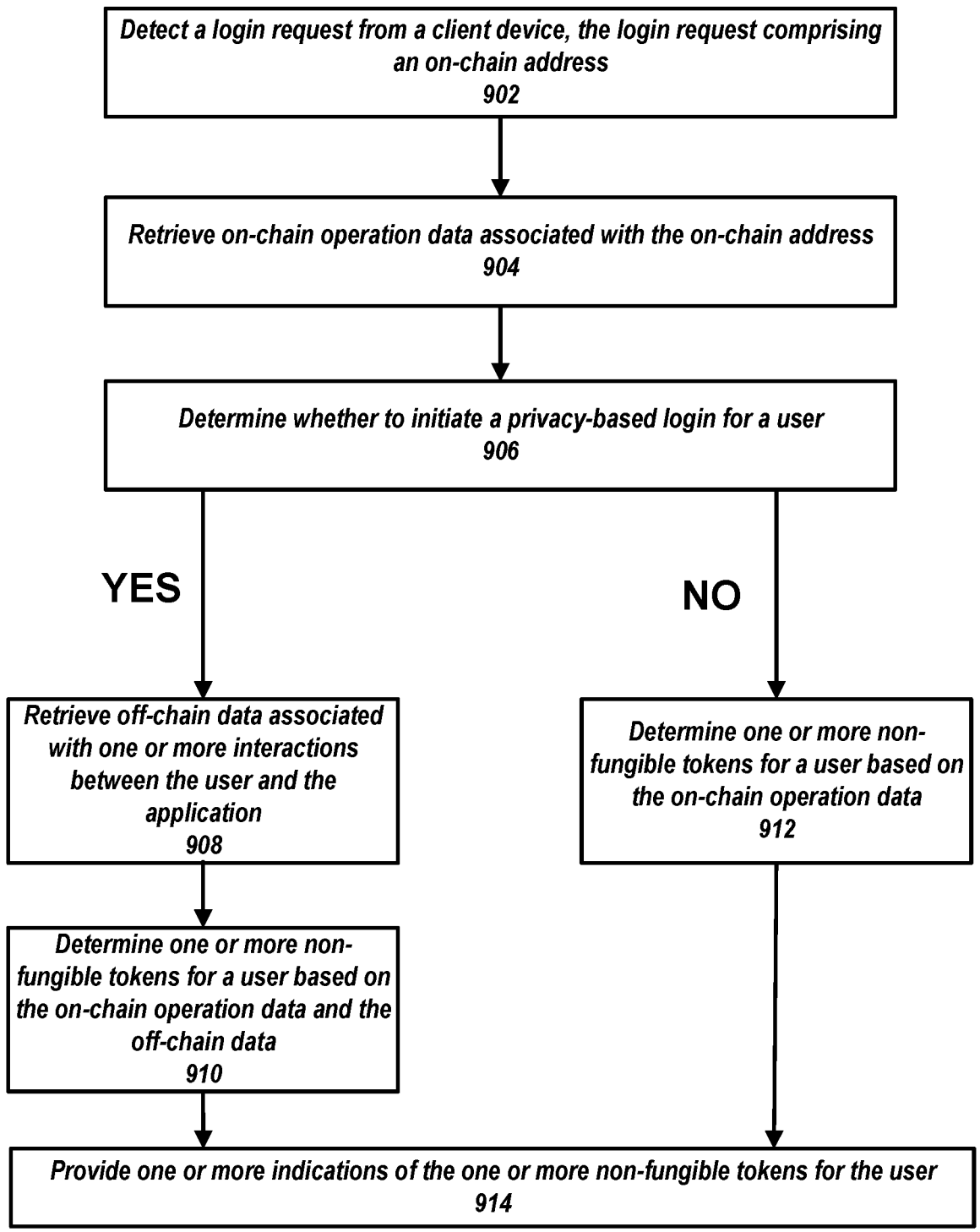
FIG. 9 is a flowchart of operations for performing a privacy-preserving login, in accordance with one or more embodiments of this disclosure.

FIG. 9 is a flowchart of process 900 for performing a privacy-preserving login using on-chain data. The operations of FIG. 9 may use components described in relation to FIG. 7. In some embodiments, user feed initialization system 102 may include one or more components of computer system 700. Some or all of the operations described in FIG. 8 may be combined with the operations of FIG. 9. At 902, user feed initialization system 102 detects a login request from a client device, the login request including an on-chain address (e.g., an on-chain address of a user's cryptography-based storage application). For example, the user feed initialization system 102 may detect a login request from one of the devices associated with one of the on-chain programs 108$a$-108$n$. User feed initialization system 102 may receive the login request over network 150 using network interface 740.

At 904, user feed initialization system 102 retrieves on-chain operation data associated with the on-chain address. User feed initialization system 102 may use one or more processors 710$a$, 710$b$, and/or 710$n$ to perform the retrieval. User feed initialization system 102 may retrieve the data from memory and/or from data node 104. The retrieval operation may be performed using a blockchain node via a network 150. At 906, user feed initialization system 102 determines whether to initiate a privacy-preserving login for a user. For example, user feed initialization system 102 may use one or more processors 710$a$-710$n$ to perform the operation.

Process 900 may move to operations 908 and 910 based on a determination to not initiate a privacy-preserving login. At 908, user feed initialization system 102 retrieves off-chain data associated with one or more interactions between the user and the application. For example, user feed initialization system 102 may use one or more processors 710$a$-710$n$ to perform the operation. User feed initialization system 102 may retrieve the on-chain data from a blockchain node, for example, using an API call. In some embodiments, user feed initialization system may retrieve the on-chain data from a database (e.g., a database on data node 104) via network 150 using network interface 740. At 910, user feed initialization system 102 determines one or more non-fungible tokens for a user based on the on-chain operation data and the off-chain data. For example, user feed initialization system 102 may use one or more processors 710$a$-710$n$ to perform the operation and store the results in system memory 720.

Process 900 may move to operation 912 based on a determination to initiate a privacy-preserving login. At 912, user feed initialization system 102 determines one or more non-fungible tokens for a user based on the on-chain operation data. For example, user feed initialization system 102 may use one or more processors 710$a$-710$n$ to perform the operation and store the results in system memory 720. At 914, user feed initialization system 102 provides one or more indications of the one or more non-fungible tokens for the user. For example, user feed initialization system 102 may transmit the results to a client device using network interface 740 via network 150.

Figure 10:
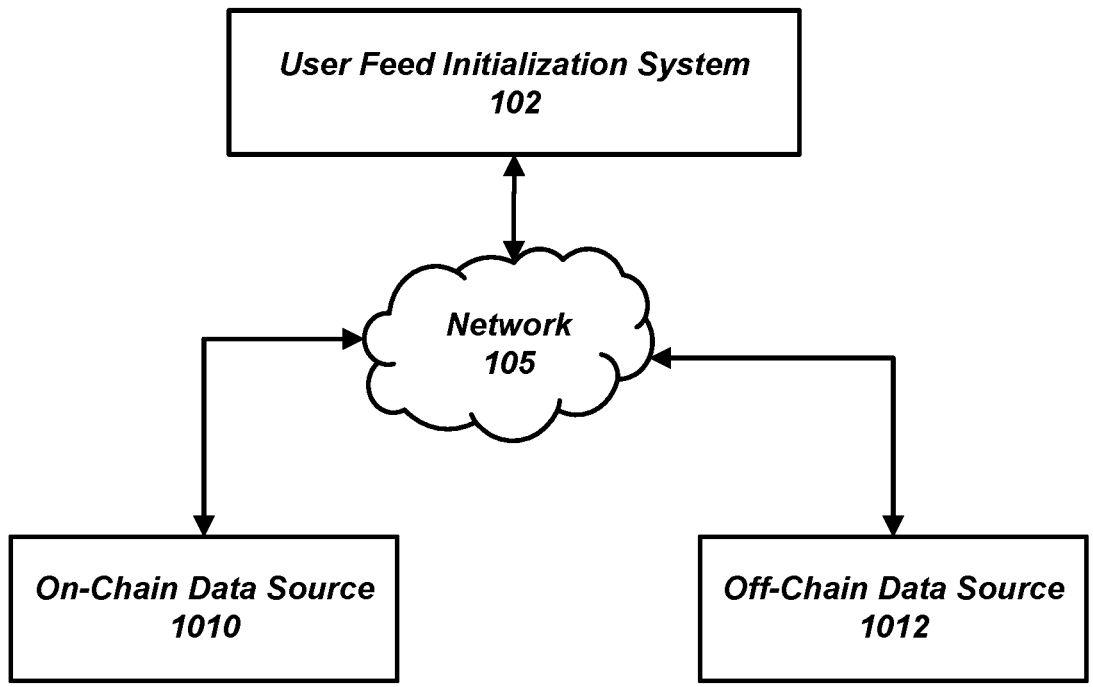
FIG. 10 illustrates information sources used during cold start operation and privacy-preserving login, in accordance with one or more embodiments of this disclosure.
Figure 10:
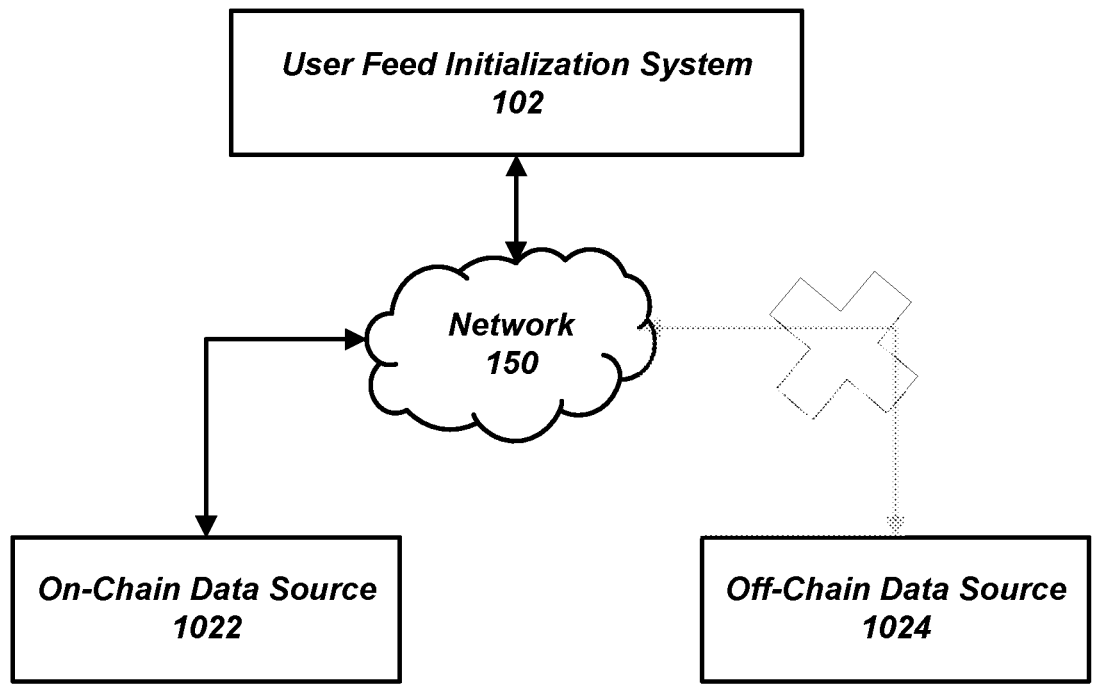

FIG. 10 illustrates different data sources that may be queried during cold start operation and privacy-preserving login. Diagram 1000 illustrates a cold start-up scenario, where user initialization system 102 uses network 105 to query both on-chain data source 1010 and off-chain data source 1012. On-chain data source may be a blockchain node or may be data within a database that was already pulled from a blockchain node. Although, during cold start-up, there is no off-chain data that exists because it was the first time the user logs into the system, the off-chain data source is still queries. Diagram 1020 illustrates the privacy-preserving scenario. In this scenario, the system may query on-chain data source 1022, which may be the same data source as on-chain data source 1010. However, the system may not query off-chain data source 1024 because privacy has been requested.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for a cold start operation will be better understood with reference to the following enumerated embodiments:

1. A method for performing a cold start operation using on-chain data, the method comprising: receiving an on-chain address associated with a cryptography-based storage application; retrieving blockchain operation data associated with the on-chain address, wherein the blockchain operation data comprises one or more program identifiers for one or more on-chain programs; generating, based on the one or more program identifiers, one or more data requests for the one or more on-chain programs to obtain one or more sets of non-fungible token attributes, wherein each data request of the one or more data requests comprises a query to a corresponding on-chain program for non-fungible token data, and wherein each set of the one or more sets of non-fungible token attributes is associated with a corresponding non-fungible token; determining, via a machine learning model, one or more non-fungible tokens for a user based on the one or more sets of non-fungible token attributes; and providing one or more indications of the one or more non-fungible tokens to a user device of the user.
2. Any of the preceding embodiments, wherein the on-chain address associated with the cryptography-based storage application is received in response to detecting an initial login associated with a user indicating that the user has not logged in before.
3. Any of the preceding embodiments, wherein retrieving the blockchain operation data associated with the on-chain address further comprises: identifying a plurality of cryptographic tokens associated with the on-chain address; determining, a subset of the plurality of cryptographic tokens comprising non-fungible tokens; determining, based on each non-fungible token in the subset, one or more on-chain programs associated with the subset; and extracting program identifiers for a plurality of on-chain programs from the subset.
4. Any of the preceding embodiments, wherein determining, via the machine learning model, the one or more non-fungible tokens for the user comprises inputting each set of non-fungible token attributes into the machine learning model to determine available non-fungible tokens for the user.
5. Any of the preceding embodiments, further comprising: transmitting the one or more data requests to a blockchain node of a blockchain hosting the one or more on-chain programs; receiving, from the blockchain node, a corresponding set of non-fungible token attributes for each on-chain program of the one or more on-chain programs; and generating a dataset comprising each corresponding set of non-fungible token attributes.
6. Any of the preceding embodiments, further comprising: receiving, from the machine learning model, one or more categories of non-fungible tokens for the user; comparing the one or more categories of non-fungible tokens with a plurality of non-fungible token categories within a database, wherein each category of the one or more categories of non-fungible tokens corresponds to one or more available non-fungible tokens; and identifying the one or more non-fungible tokens that match the one or more categories of non-fungible tokens.
7. Any of the preceding embodiments, wherein identifying the one or more non-fungible tokens comprises: determining an associated on-chain program for a first category of the one or more categories of non-fungible tokens; and receiving, from the associated on-chain program, a listing of available non-fungible tokens.
8. Any of the preceding embodiments, further comprising training the machine learning model by: receiving a training dataset comprising a plurality of attribute sets corresponding to a plurality of non-fungible tokens, wherein each attribute set comprises a plurality of attributes and a label classifying each corresponding non-fungible token; and inputting the training dataset into a training routine of the machine learning model, wherein the training routine trains the machine learning model using the training dataset.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

The present techniques for a privacy-preserving operation will be better understood with reference to the following enumerated embodiments:

1. A method for generating data feeds for users of cryptography-based storage applications, the method comprising: detecting, at an application, a login request from a client device, the login request comprising an on-chain address of a cryptography-based storage application; retrieving on-chain operation data associated with the on-chain address, wherein the on-chain operation data comprises one or more program identifiers for one or more on-chain programs; determining, based on one or more login parameters associated with the on-chain address, whether to initiate a privacy-preserving login for a user; based on determining to not initiate the privacy-preserving login for the user: retrieving off-chain data associated with one or more interactions between the user and the application; and determining, via a machine learning model, one or more non-fungible tokens for a user based on the on-chain operation data and the off-chain data; and based on determining to initiate the privacy-preserving login for the user: determining, via a machine learning model, one or more non-fungible tokens for a user based on the on-chain operation data without using the off-chain data; and providing one or more indications of the one or more non-fungible tokens for the user to a user device of the user.
2. Any of the preceding embodiments, wherein determining, based on the one or more login parameters associated with the login request, whether to initiate the privacy-preserving login further comprises: extracting the on-chain address associated with the cryptography-based storage application from the login request; retrieving a profile associated with the on-chain address; determining, whether the profile associated with the on-chain address includes a privacy flag; and in response to determining that the profile associated with the on-chain address includes the privacy flag, initiating the privacy-preserving login.
3. Any of the preceding embodiments, wherein determining, based on the one or more login parameters associated with the login request, whether to initiate the privacy-preserving login, further comprises: determining, based on the on-chain address, that the cryptography-based storage application was not used in a prior login request; and in response to determining that the cryptography-based storage application was not used in the prior login request, generate for display, using the application, a prompt for setting a privacy flag for a profile associated with the on-chain address.
4. Any of the preceding embodiments, further comprising: determining, for a first non-fungible token associated with the on-chain address, that the first non-fungible token represents an image; generating, using an image analysis algorithm, a pattern associated with the image; and adding the pattern to a corresponding non-fungible token dataset.
5. Any of the preceding embodiments, wherein retrieving the on-chain operation data associated with the on-chain address further comprises: identifying a plurality of cryptographic tokens associated with the on-chain address; determining a subset of the plurality of cryptographic tokens comprising non-fungible tokens; determining, based on non-fungible tokens in the subset, the one or more on-chain programs associated with the subset; and extracting the one or more program identifiers for the one or more on-chain programs from the subset.
6. Any of the preceding embodiments, further comprising: based on determining to initiate the privacy-preserving login for the user, generating, using the one or more program identifiers, data requests for the one or more on-chain programs to obtain, from the one or more on-chain programs, non-fungible token datasets associated with the on-chain address, wherein each of the data requests comprises (i) a query to a corresponding on-chain program for non-fungible token data and (ii) a program identifier for the corresponding on-chain program, and wherein each of the non-fungible token datasets comprises a set of non-fungible token attributes associated with a corresponding non-fungible token.
7. Any of the preceding embodiments, further comprising: transmitting the one or more data requests to a blockchain node of a blockchain hosting the one or more on-chain programs; receiving, from the blockchain node, a corresponding set of non-fungible token attributes for the one or more on-chain programs; and generating a dataset comprising corresponding sets of non-fungible token attributes.
8. Any of the preceding embodiments, further comprising: receiving, from the machine learning model, one or more categories of non-fungible tokens for the user; comparing the one or more categories of the non-fungible tokens with a plurality of non-fungible token categories within a database, wherein each category of the one or more categories of the non-fungible tokens corresponds to one or more available non-fungible tokens; and identifying the one or more non-fungible tokens that match the one or more categories of the non-fungible tokens.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for performing a cold start operation using on-chain data, the system comprising:
one or more processors; and
one or more non-transitory computer-readable storage media storing instructions, which, when executed by the one or more processors, cause the one or more processors to:
in response to detecting an initial login associated with a user, for an on-chain user address associated with a cryptography-based storage application, retrieving blockchain operation datasets associated with the on-chain user address and extracting program identifiers for a plurality of on-chain programs from the blockchain operation datasets;
generating, using the program identifiers, data requests for the plurality of on-chain programs to obtain, from the plurality of on-chain programs, non-fungible token datasets associated with the on-chain user address, wherein each of the data requests comprises (i) a query to a corresponding on-chain program for non-fungible token data and (ii) a program identifier for the corresponding on-chain program, and wherein each of the non-fungible token datasets comprises a set of non-fungible token attributes associated with a corresponding non-fungible token;
inputting each set of non-fungible token attributes into a machine learning model to determine available non-fungible tokens for the user; and
providing, via a data feed, indications of the available non-fungible tokens to a user device of the user.

2. The system of claim 1, wherein the instructions for extracting the program identifiers for the plurality of on-chain programs from the blockchain operation datasets, further cause the one or more processors to perform operations comprising:
identifying a plurality of cryptographic tokens associated with the on-chain user address;
determining, a subset of the plurality of cryptographic tokens comprising non-fungible tokens;
determining based on each non-fungible token in the subset, one or more on-chain programs associated with the subset; and extracting a corresponding program identifier for each on-chain program.

3. The system of claim 1, wherein the instructions further cause the one or more processors to perform operations comprising:
transmitting the data requests to a blockchain node of a blockchain hosting one or more of the plurality of on-chain programs;
receiving, from the blockchain node, a corresponding set of non-fungible token attributes for each on-chain program of the plurality of on-chain programs; and
generating a dataset comprising each corresponding set of non-fungible token attributes.

4. The system of claim 1, wherein the instructions further cause the one or more processors to perform operations comprising:
receiving, from the machine learning model in response to inputting each set of non-fungible token attributes, one or more categories of non-fungible tokens;
comparing the one or more categories of the non-fungible tokens with a plurality of non-fungible token categories within a database, wherein each non-fungible token category of the plurality of non-fungible token categories corresponds to one or more available non-fungible tokens; and
identifying, based on comparing the one or more categories of the non-fungible tokens with the plurality of non-fungible token categories within the database, one or more non-fungible tokens for the user.

5. A method for performing a cold start operation using on-chain data, the method comprising:
receiving an on-chain address associated with a cryptography-based storage application;
retrieving blockchain operation data associated with the on-chain address, wherein the blockchain operation data comprises one or more program identifiers for one or more on-chain programs;
generating, based on the one or more program identifiers, one or more data requests for the one or more on-chain programs to obtain one or more sets of non-fungible token attributes, wherein each data request of the one or more data requests comprises a query to a corresponding on-chain program for non-fungible token data, and wherein each set of the one or more sets of non-fungible token attributes is associated with a corresponding non-fungible token;
determining, via a machine learning model, one or more non-fungible tokens for a user based on the one or more sets of non-fungible token attributes; and
providing one or more indications of the one or more non-fungible tokens to a user device of the user.

6. The method of claim 5, wherein the on-chain address associated with the cryptography-based storage application is received in response to detecting an initial login associated with the user indicating that the user has not logged in before.

7. The method of claim 5, wherein retrieving the blockchain operation data associated with the on-chain address further comprises:
identifying a plurality of cryptographic tokens associated with the on-chain address;
determining, a subset of the plurality of cryptographic tokens comprising non-fungible tokens;
determining, based on each non-fungible token in the subset, one or more on-chain programs associated with the subset; and
extracting program identifiers for a plurality of on-chain programs from the subset.

8. The method of claim 5, further comprising:
determining, for a first non-fungible token associated with the on-chain address, that the first non-fungible token represents an image;
generating, using an image analysis algorithm, a pattern associated with the image; and
adding the pattern to a corresponding non-fungible token data.

9. The method of claim 5, further comprising:
transmitting the one or more data requests to a blockchain node of a blockchain hosting the one or more on-chain programs;
receiving, from the blockchain node, a corresponding set of non-fungible token attributes for each on-chain program of the one or more on-chain programs; and
generating a dataset comprising each corresponding set of non-fungible token attributes.

10. The method of claim 5, further comprising:
receiving, from the machine learning model, one or more categories of non-fungible tokens for the user;
comparing the one or more categories of non-fungible tokens with a plurality of non-fungible token categories within a database, wherein each category of the one or more categories of non-fungible tokens corresponds to one or more available non-fungible tokens; and
identifying the one or more non-fungible tokens that match the one or more categories of non-fungible tokens.

11. The method of claim 10, wherein identifying the one or more non-fungible tokens comprises:
determining an associated on-chain program for a first category of the one or more categories of non-fungible tokens; and
receiving, from the associated on-chain program, a listing of available non-fungible tokens.

12. The method of claim 5, further comprising training the machine learning model by:
receiving a training dataset comprising a plurality of attribute sets corresponding to a plurality of non-fungible tokens, wherein each attribute set comprises a plurality of attributes and a label classifying each corresponding non-fungible token; and
inputting the training dataset into a training routine of the machine learning model, wherein the training routine trains the machine learning model using the training dataset.

13. One or more non-transitory, computer-readable media comprising instructions that, when executed by one or more processors, cause the one or more processors to perform operations comprising:
detecting a cryptography-based storage application associated with a user;
receiving an on-chain address associated with the cryptography-based storage application;
retrieving blockchain operation data associated with the on-chain address, wherein the blockchain operation data comprises one or more operations associated with one or more on-chain programs;
generating, based on the one or more operations, one or more data requests to obtain one or more program identifiers for the one or more on-chain programs, a respective one of the one or more program identifiers being associated with a corresponding set of non-fungible tokens;

determining, using data provided by a machine learning model, one or more non-fungible tokens for the user based on the one or more program identifiers; and providing one or more indications of the one or more non-fungible tokens to a user device of the user.

14. The one or more non-transitory, computer-readable media of claim 13, wherein the on-chain address associated with the cryptography-based storage application is received in response to detecting an initial login associated with the user indicating that the user has not logged in before.

15. The one or more non-transitory, computer-readable media of claim 13, wherein the instructions for retrieving the blockchain operation data associated with the on-chain address further cause the one or more processors to perform operations comprising:

identifying a plurality of cryptographic tokens associated with the on-chain address;

determining a subset of the plurality of cryptographic tokens comprising non-fungible tokens;

determining, based on each non-fungible token in the subset, one or more on-chain program associated with the subset; and extracting program identifiers for a plurality of on-chain programs from the subset.

16. The one or more non-transitory, computer-readable media of claim 13, wherein the instructions for determining, via the machine learning model, the one or more non-fungible tokens for the user further cause the one or more processors to input each set of non-fungible token attributes into the machine learning model to determine available non-fungible tokens for the user.

17. The one or more non-transitory, computer-readable media of claim 13, wherein the instructions further cause the one or more processors to perform operations comprising:

transmitting the one or more data requests to a blockchain node of a blockchain hosting the one or more on-chain programs;

receiving, from the blockchain node, a corresponding set of non-fungible token attributes for each on-chain program of the one or more on-chain programs; and generating a dataset comprising each corresponding set of non-fungible token attributes.

18. The one or more non-transitory, computer-readable media of claim 13, wherein the instructions further cause the one or more processors to perform operations comprising:

receiving, from the machine learning model, one or more categories of non-fungible tokens for the user;

comparing the one or more categories of non-fungible tokens with a plurality of non-fungible token categories within a database, wherein each category of the one or more categories of non-fungible tokens corresponds to one or more available non-fungible tokens; and identifying the one or more non-fungible tokens that match the one or more categories of non-fungible tokens.

19. The one or more non-transitory, computer-readable media of claim 18, wherein the instructions for identifying the one or more non-fungible tokens further cause the one or more processors to perform operations comprising:

determining an associated on-chain program for a first category of the one or more categories of non-fungible tokens; and receiving, from the associated on-chain program, a listing of available non-fungible tokens.

20. The one or more non-transitory, computer-readable media of claim 13, further comprising instructions for training the machine learning model by:

receiving a training dataset comprising a plurality of attribute sets corresponding to a plurality of non-fungible tokens, wherein each attribute set comprises a plurality of attributes and a label classifying each corresponding non-fungible token; and inputting the training dataset into a training routine of the machine learning model, wherein the training routine trains the machine learning model using the training dataset.

* * * * *